T. H. DUNHAM.
FIRE-EXTINGUISHING APPARATUS.

No. 176,608. Patented April 25, 1876.

WITNESSES:
Grenville Lewis
L. H. Trook

INVENTOR:
Thomas H. Dunham,
By Stansbury & Munn,
Attorneys.

UNITED STATES PATENT OFFICE.

THOMAS H. DUNHAM, OF BOSTON, MASSACHUSETTS.

IMPROVEMENT IN FIRE-EXTINGUISHING APPARATUS.

Specification forming part of Letters Patent No. 176,608, dated April 25, 1876; application filed September 2, 1875.

*To all whom it may concern:*

Be it known that I, THOMAS H. DUNHAM, of Boston, in the county of Suffolk and State of Massachusetts, have invented an Improved Apparatus for Extinguishing Fires; and I do hereby declare the following to be a full and correct description of the same, reference being had to the accompanying drawings, in which—

Figure 1:
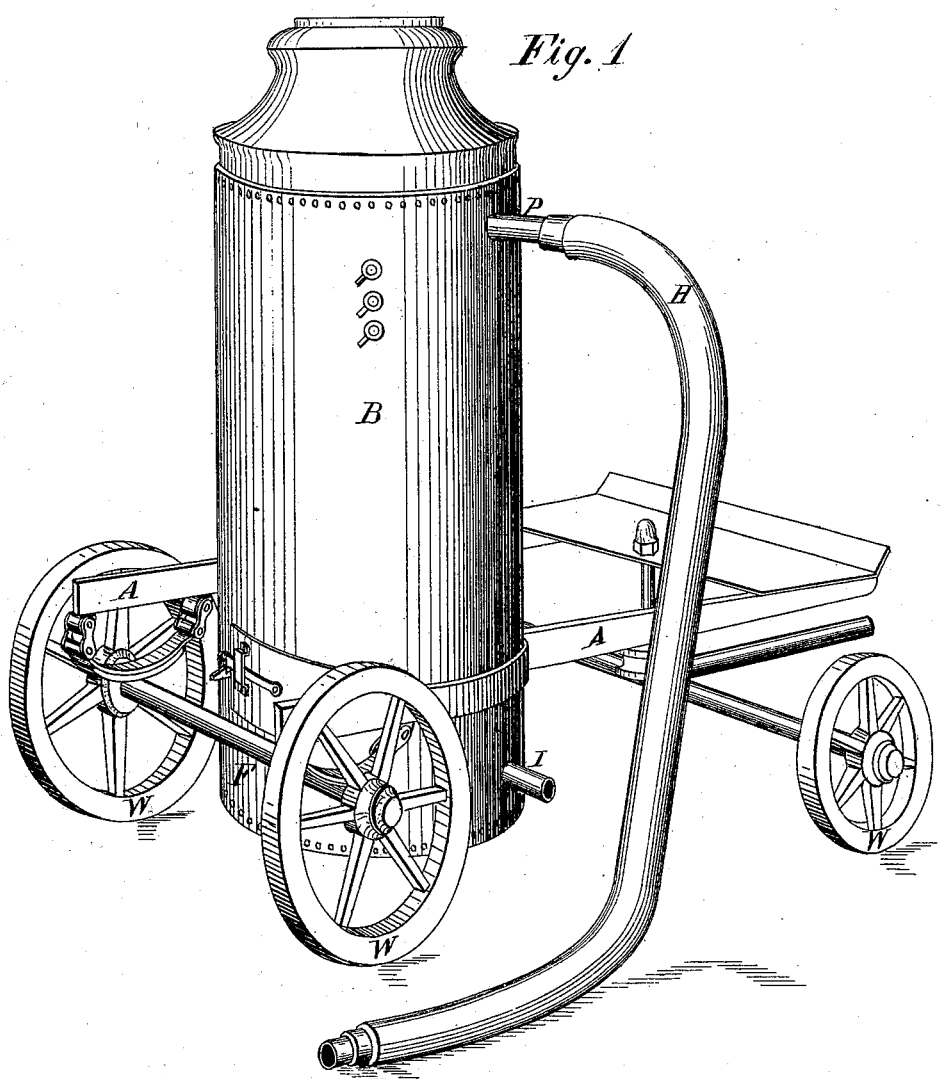
Figure 2:
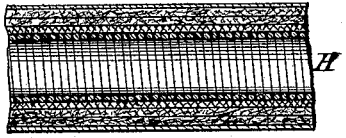

Figure 1 is a perspective view of my fire-engine, and Fig. 2 a longitudinal section of the steam-conducting hose.

The nature of my invention consists in the mounting of a steam-boiler and furnace, provided with steam-conducting hose, upon a suitable carriage to form a portable apparatus for the extinguishing of fires by the direct application of steam.

In the accompanying drawings, A marks the frame, and W the wheels, of a carriage or truck, upon which is mounted a boiler, B, having a furnace, F, below it. I prefer to use the tubular boiler, such as is usually employed in fire-engines. Water is supplied to the boiler in any convenient manner through the injection-pipe I, and the steam is drawn off through the hose H, coupled to the pipe P.

The steam-conducting hose I make of several thicknesses of woven fabric, with wire woven into it, the whole being tarred in the manner described in my patents for the preparation of tarred fabrics, and covered with a number of layers of felt. The woven and wired fabric is treated with white or red lead to make it steam-tight. The outer covering of felt is to make the hose more easy to handle when hot. I contemplate mounting on the carriage a small pumping-engine to supply the boiler with water and operating it by the steam from the boiler.

I claim—

A steam-boiler and furnace mounted upon a suitable carriage and provided with steam-conducting hose, the whole forming a portable apparatus applicable to the extinguishing of fires by the direct application of steam, as set forth.

The above specification of my said invention signed and witnessed at Washington this 18th day of August, A. D. 1875.

THOMAS H. DUNHAM.

Witnesses:
JOS. T. K. PLANT,
CHAS. F. STANSBURY.